April 6, 1937.   A. J. ALLEN   2,076,492

ELECTRICAL METER INSTALLATION

Filed Jan. 17, 1935   3 Sheets-Sheet 1

WITNESSES:

INVENTOR
Albert J. Allen.
BY
ATTORNEY

April 6, 1937.  A. J. ALLEN  2,076,492
ELECTRICAL METER INSTALLATION
Filed Jan. 17, 1935  3 Sheets-Sheet 2
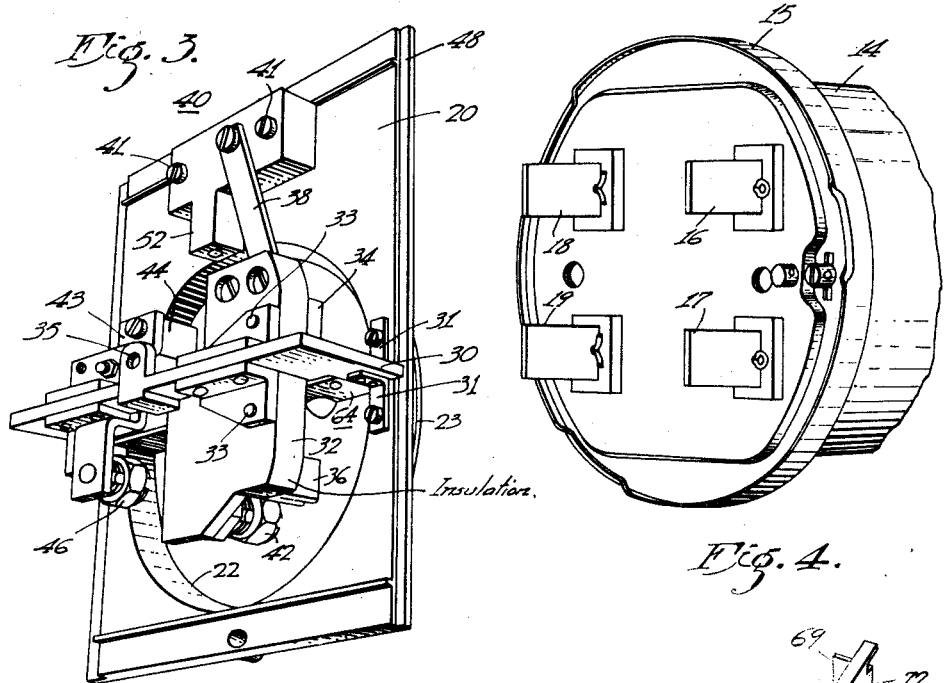
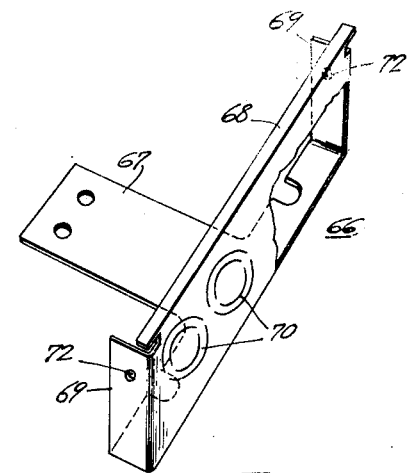
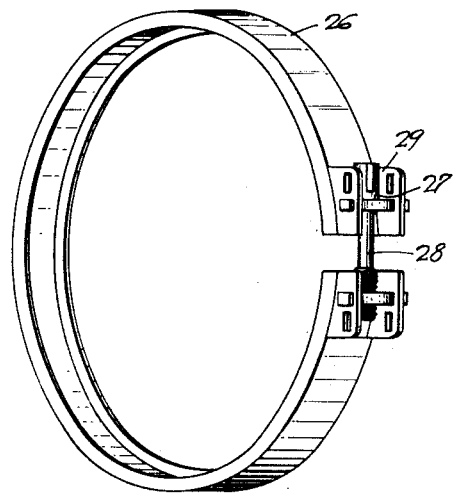
WITNESSES:  INVENTOR
Albert J. Allen.
BY
ATTORNEY April 6, 1937. A. J. ALLEN 2,076,492
ELECTRICAL METER INSTALLATION
Filed Jan. 17, 1935 3 Sheets-Sheet 3

WITNESSES:

INVENTOR
Albert J. Allen.
BY
ATTORNEY

Patented Apr. 6, 1937

2,076,492

UNITED STATES PATENT OFFICE 2,076,492

ELECTRICAL METER INSTALLATION

Albert J. Allen, Brooklyn, N. Y., assignor to Westinghouse Electric & Manufacturing Company, East Pittsburgh, Pa., a corporation of Pennsylvania Application January 17, 1935, Serial No. 2,181

9 Claims. (Cl. 247—2)

The present invention relates to an improved mounting for electrical measuring instruments, and more particularly to a group mounting for a plurality of watthour meters involving a new and improved metering system for use in connection therewith.

The invention contemplates an improved mounting for so-called "detachable" meters of the general character described in Patent No. 1,969,499, issued August 7, 1934, to W. M. Bradshaw, et al., and has for its object the provision of a mounting for a plurality of such meters in a manner to conserve space requirements and obtain a lower cost of installation over the mounting of a plurality of individual meters as shown in such patent, or over the mounting of a plurality of meters of the conventional type.

A further object of the invention is to provide a mounting for a group of meters wherein provision is made for readily increasing or decreasing the number of meters in accordance with expansion requirements, and for readily controlling the connection of the meters to their respective load circuits.

A further object of the invention is to provide a mounting for watthour meters wherein the possibility of unauthorized energy diversion is minimized.

A further object of the invention is to provide a mounting for a plurality of meters wherein the testing of the individual meters is facilitated and rendered relatively safe with respect to the tester.

A further object of the invention is to provide a number of structural and electrical features contributing to the attainment of the foregoing objectives.

Other objects of the invention will be apparent from the following description, taken in conjunction with the accompanying drawings, wherein:

Fig. 3 is a view in perspective of the back of the sub-base shown in Fig. 2;

Fig. 4 is a view, in perspective, of the base of a watthour meter of the type contemplated by the present invention;

Fig. 5 is a view in perspective of a sealing and clamping ring for mounting the meter of Fig. 4 upon the sub-base of Figs. 2 and 3;

Fig. 6 is a view in perspective of an end closure for the channels shown in Fig. 1;

Fig. 7 is a view in perspective of an element of the assembly shown in Fig. 1;

Figure 1:
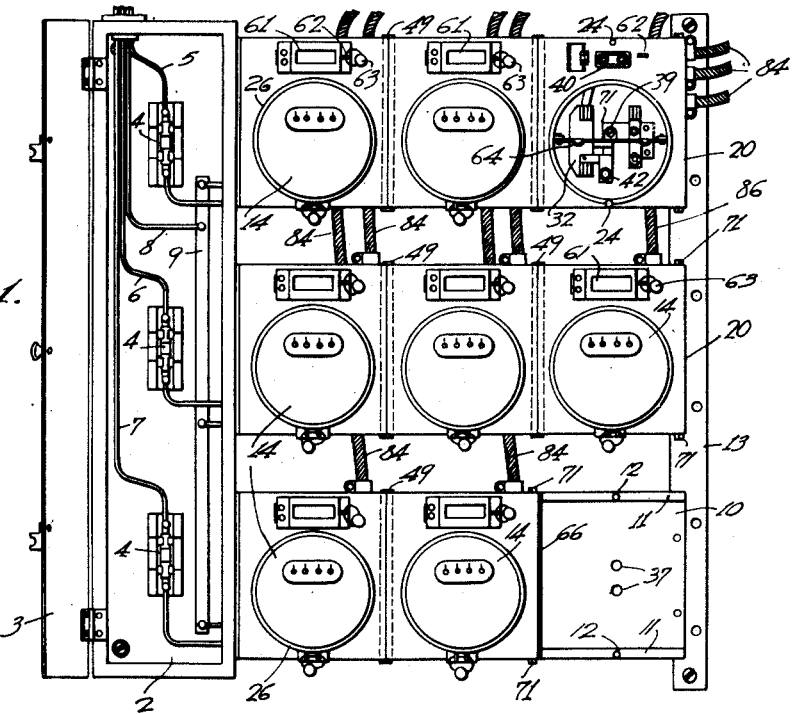
Figure 1 is a view in elevation of a group mounting for a plurality of meters in accordance with the present invention.

Referring more specifically to Fig. 1, the invention contemplates, by way of example, an elongated casing 2, having a suitable cover 3, for enclosing a plurality of fuses 4 and the incoming service conductors for the various circuits to be metered comprising phase conductors 5, 6, and 7 and a neutral conductor 8. Extending laterally from the chamber 2, to the right thereof as viewed in Fig. 1, are a plurality of conduit channels 10 suitably bolted to the casing 2, communicating with the interior thereof and suitably secured at their free extremities to a support 13.

Each channel 10 is provided with a pair of longitudinally-extending flanges 11 having screw-threaded apertures 12 therein for a purpose hereinafter described. Each channel is provided in its side walls with knock-outs (not shown) or other means for permitting conductors to be extended into the channel through flexible cable, conduit, or the like.

The assembly shown in Fig. 1 is particularly adapted for an installation of the three-phase, four-wire alternating-current type including three phase conductors and a neutral conductor. One phase conductor is extended through each of the three channels 10 for connection to the respective meters, as hereinafter described, and the neutral conductor 8 is electrically connected to a bus bar 9 in the chamber 2, to provide a common feed for the three neutral conductors extending, respectively, through the channels 10. Further, the installation shown is particularly adapted for at least nine meters; it being contemplated that for a smaller number than nine, a single channel 10 will be employed, all of the meters being connected to the same phase of the service line.

A fuse 4 is connected in each of the phase conductors 5, 6, and 7. In installations where the service supplies only the meter bank, the fuses may be omitted because the service switch fuses, exterior of the chamber 2, adequately protect the meter installation. If other circuits extend from the service switch it is desirable to provide a fuse for each phase conductor as in Fig. 1. One fuse may be used to protect a given number of meters connected to the same phase of the supply, and if a greater number of meters is installed in each channel, as within the contemplated scope of the present invention, additional fuses may be grouped with the fuses shown in Fig. 1 to provide the desired protection. In this event, the various fuses for each channel are supplied in parallel from the respective service conductors and separate conductors for each fuse will be extended through the channel for connection to the appropriate meters.

Referring to Fig. 4, the type of watthour meter applicable to the present invention comprises a metal base having a glass cover 14 suitably secured to the base as by a flange 15 for enclosing the meter mechanism. A preferred construction is similar to that shown in the above-mentioned Patent No. 1,969,499. Four contact blades 16, 17, 18, and 19 project from the base and are electrically connected to the operating windings within the meter, as described hereinafter.

The meters are mounted on the channels of Fig. 1 by sub-bases or adapters, each comprising a plate 20 having an enlarged aperture therein for cooperating with the base of the meter shown in Fig. 4, and an upstanding collar 22 surrounding said aperture provided with a flange 23 upon which the meter flange 15 is adapted to rest.

The plate 20 is proportioned to bridge the channel 10 and to be secured thereto by screws 24 (upper right-hand portion of Fig. 1) extending through apertures 25 in the plate 20 and in threaded engagement with the apertures 12 in the channel flanges 11.

Referring to Fig. 3, each of the plates 20 is provided with a bridge 30, suitably secured to the plate by angles 31 or cast integral therewith, which bridges the opening defined by the collars 22. A block 32 of insulating material is secured to the bridge 30 by screws 33 for supporting spring jaw terminals 34 and 36, and for supporting a conducting strap 38 which is electrically connected to the contact jaw 34 and extends to a connection and testing block 40, hereinafter described. A terminal post 42 is also carried by the block 32, electrically connected to the contact jaw 36 by a conducting strip, for receiving one of the supply conductors, as hereinafter described.

Adjacent to the center of the bridge 30, an apertured lug 35 is provided in a position to register with either of two threaded holes 37, in the bottom of channel 10 (Fig. 1) for receiving a screw 39 which is an additional means for securing the plate 20 in position. Two threaded holes 37 are provided for each plate 20 so that, if the conditions of the installation necessitate it and a channel is turned end-to-end and projected from the left side of the end box 2, as viewed in Fig. 1, there will be a hole 37 to receive the screw 39.

A supporting strip 43 is also secured to the bridge member 30, and is electrically connected thereto, for supporting a contact jaw 44, a load terminal 45, and a terminal post 46, for connection with the neutral wire of the supply, as hereinafter pointed out.

Figure 9:
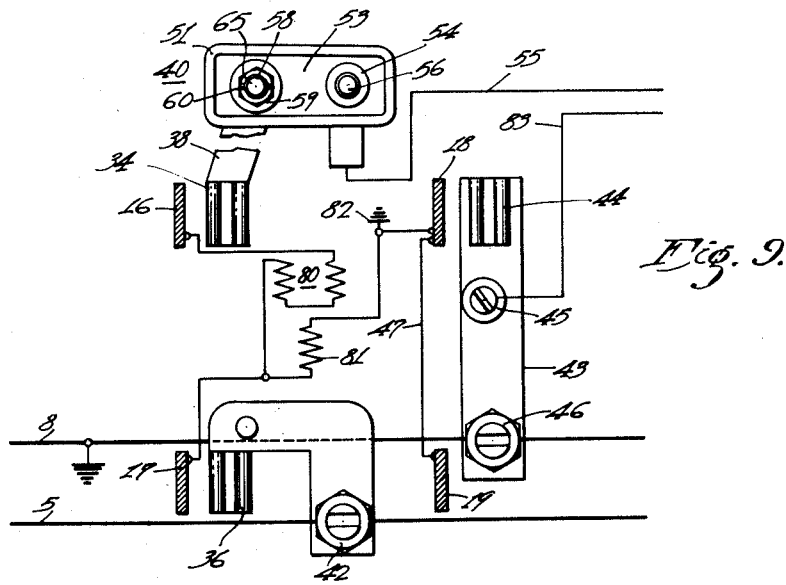
Fig. 9 is a circuit diagram showing the electrical connections for meters installed in accordance with the invention.

The contact jaws 34, 36 and 44 are in a common plane somewhat below the plane defined by the flange 23 and in a position to engage the terminals 16, 17, and 18 of the meter when the latter is in operative position. Although four contact blades are shown on the meter of Fig. 4, because it is of a conventional type, only three contact jaws are required because the grounded neutral of the supply circuit avoids the necessity of providing a connection to the fourth terminal 19 of Fig. 4. Within the meter a jumper 47 may be, and usually is, provided between the two left-hand terminals 18 and 19 of the meter as indicated in Fig. 9, so that these two terminals are electrically connected. It is contemplated, of course, that with a different type of supply circuit a contact jaw terminal may be provided for each of the meter contact blades, but in the present instance, the assembly of the plate 20 is simplified, and there are additional advantages, as hereinafter pointed out, with respect to the unauthorized diversion of energy.

The terminals 42 and 46 each comprise a threaded stud having a longitudinally extending slot open at the free end of the stud in which a conductor or bus-bar may be placed. A nut may then be screwed down on the stud to electrically and mechanically grip the conductor. It will be noted, referring to Fig. 3, that the terminals 42 and 46 are in different planes; the terminal 46 for the grounded neutral conductor being disposed close to the channel base, and the terminal 42 being spaced between said base and the plane of the plate 20.

Referring to Fig. 3, it will be noted that the plate 20 is provided with a narrow flange 48 along each side, and that the base of the bridge 30 is spaced from the flange by a slight amount. This construction is to accommodate a thin metal strip 49, shown in Fig. 7, which is wider than such flange and which overlies the abutting joint between adjacent flanges when the plates are mounted on a channel 10. Such strip passes between such flanges and the bases of adjacent bridges 30 so that if one of the plates is released from the channel, by removing the securing screws 24 and 39 such plate cannot be removed because it is interlocked by means of the strips 49 to adjacent plates 20. In order to remove a particular plate, therefore, it is necessary to remove all of the plates to the right of it, as viewed in Fig. 1, in sequence beginning at the extreme right. The bent ends of the strip 49 embrace the sides of the channel to maintain the strip in interlocking position.

When the meter is in operative position upon the sub-base, a clamping ring 26, as shown in Fig. 5, may be applied to embrace the flange 15 on the meter and the flanged rim 23 on the collar 22. A seal of the wire-and-wafer type, or other suitable type, may be applied to the clamping ring 26 to discourage unauthorized removal of the meter, as by threading the sealing wire through apertures 27 in the clamping screw 28 and adjacent structure 29 to prevent unscrewing the clamping screw without breaking the wire. The ring 26, when in operative position, covers the head of screw 24 extending through the lower aperture 25 so that such screw cannot be removed without first removing the ring.

Figure 2:
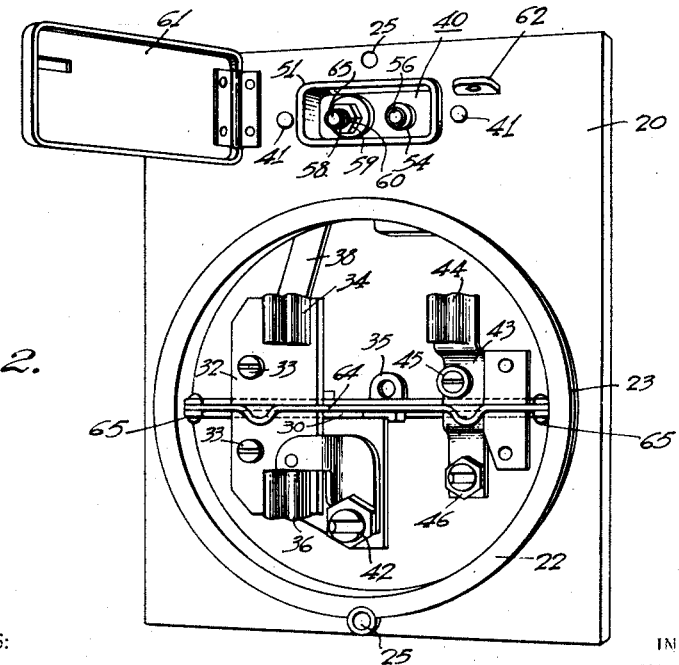
Fig. 2 is a view in perspective of a sub-base for mounting a meter in the group shown in Fig. 1.
Figure 8:
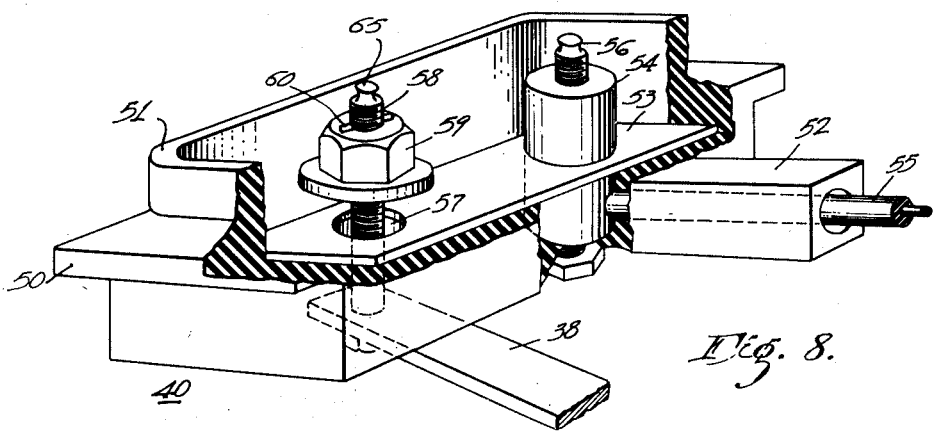
Fig. 8 is an enlarged view in perspective of a connection and testing block for meters in accordance with the present invention.

The connection and testing block 40 for each meter is secured to the sub-base plate 20 by screws 41, as indicated in Figs. 2 and 3, and serves the dual purpose of controlling the connection of the consumer's load circuit to the meter and facilitating testing of the meter. The block 40, as shown more clearly in Fig. 8, comprises a substantially rectangular block 50 of insulating material having a depressed portion in one face thereof surrounded by a collar 51 and an apertured extension 52 for receiving a conductor. The collar 51 is proportioned to project through an opening in the sub-base plate 20, as shown in Fig. 2.

A conducting plate 53 is mounted in the depressed portion of block 50, and a terminal 54 extending through the plate and block is secured in position by a nut as shown. The terminal 54 is provided with an opening, in alignment with the aperture through the extended portion 52, for receiving the bared end of a conductor 55 which is clamped in the opening by means of a terminal screw 56 having a head portion shaped to receive a standard type of test-clip.

An enlarged hole 57 is provided in the plate 53 remote from terminal 54 for receiving, in spaced relation, a terminal screw 58 which is threaded through the block 50 for securing the conducting strap 38 to the rear face of the block. A nut 59 having an enlarged base greater in diameter than that of the hole 57 is threaded on the screw 58 to electrically connect the terminal screw 58 to the plate 53. The end of screw 58 is shaped to receive a usual test-clip, and a pin 60 may be provided above the nut 59 to limit its outward movement.

From the foregoing it should be apparent that when the nut 59 is screwed down to seat on the plate 53, an electrical connection is completed from the contact jaw 34 through the strap 38, plate 53 and conductor 55 and the connection may readily be broken by unscrewing the nut 59 until it is out of contact with plate 53.

The terminals 54 and 58 are surrounded by the insulating collar 51 and, when the block is mounted on the sub-base plate 20, are exposed from the front of the plate so that ready access may be had thereto without disturbing the mounting of the meter or the plate 20. A protective cover 61 (Fig. 2) is hinged to the plate 20 and is proportioned to close the chamber defined by the collar 51, and cover the head of mounting screw 24 when disposed in the aperture 25, and the ends of the screws 41.

A lug 62 is secured to the face of the plate 20 in a position to project through a slot in the cover 61 when the latter is in closed position, and the cover may be sealed in such position by a suitable sealing means, such as a wire-and-wafer seal 63, as in Fig. 1, to discourage unauthorized access to the terminals 54 and 58, as well as to the screw 24 and the ends of screws 41.

A partition 64, shown more clearly in Fig. 2, bridges the opening defined by the collar 22 and is suitably secured thereto as by rivets 65, or it may be cast integral with the bridge 30. The partition is so proportioned that when the meter is in operative position the upper edge thereof engages the base of the meter thereby completely separating the service conductors connected to the terminal posts 42 and 46 from the load conductors fed from the contact jaw 34 and load terminal 45, and serving as an additional means for preventing energy diversion as pointed out hereinafter.

The ends of the channels 10 are closed, when the sub-base plates 20 are in position, by an end plate 66, shown in detail in Fig. 6, comprising a mounting tongue 67 having two holes therein corresponding to the threaded holes 37 in the base of the channel, a flange 68 on the upper edge thereof adapted to fit between the edge flange of a plate 20 and the base of the bridge 30, and side flanges 69 for engaging the side walls of the channel. Adjacent to the base of the tongue portion 67, two notches are formed in the lower flange to embrace the heads of the screws used to secure the end of a channel to the support 13, to insure a tight joint between the base of the closure plate 66 and the bottom of the channel 10. Knock-out portions 70 may be provided in the end of the plate 66, disposed and proportioned as desired, for bringing out the load conductors, as in the top row of Fig. 1, or a trough or channel may be accommodated by a suitable knock-out.

The end plate 66 is secured in position by placing the tongue portion 67 under the lug 35 of the last plate 20 of the row, inserting the securing screw 39 through the registering openings in the lug 35 and tongue portion 67 into one of the threaded apertures 37. As indicated in the lower row of Fig. 1, the end plate 66 may be used to close the channel when one or more of the meter spaces are vacant. Here, as in the upper two rows, the tongue is secured under the mounting lug 35 of the last plate 20 in the row.

To further insure a tight closure of the channel end, screws 71 may be extended through suitable apertures in the channel side walls into threaded openings 72 in the side flanges 69 of the closure plate 66.

The structure thus far described accommodates only nine meters. As it becomes desirable to increase the number of meters, additional channel sections are added as extensions to the channels 10 in Fig. 1. Preferably, an extension is first provided for the upper row of Fig. 1 for the first three meters to be added and additional channel extensions are provided for the second and third rows, in sequence, as expansion requirements increase. In the event that there are obstructions on the wall against which the assembly is mounted rendering it difficult to extend the length of the channel sections, or to mount the original sections as shown in Fig. 1, it is contemplated that all or some of the channel sections may extend from the opposite side of the end box 2.

It should be noted that all of the structural details of the meter mounting are readily reversible so that the channels 10 may be extended from either side of the end box 2 to avoid the necessity of stocking right and left-hand parts. For example, the channels 10 are provided with knock-outs in both side walls so that if they are reversed end-to-end for extension from the left side of end box 2, knock-outs will be available in the top face to accommodate the load wires, and similarly, when the closure plate 66 is reversed there will be knock-outs available in the upper half thereof, for the load wires, corresponding to the arrangement of the upper row of Fig. 1. It is contemplated that, for the purpose of uniformity of installation practice with its attendant advantages, the load wires will always be in the upper half of the channel 10, and leave the channel either through the upper side thereof, or the upper half of the closure plate 66, and that the service wires will always be in the lower half of the channel. This necessitates a mounting such that the sub-base plates 20 may always be installed in an upright position, that is, as shown in Fig. 2, and because the apertured lug 35 of plate 20 does not coincide with the centerline of the channel, alternate threaded holes 37 are provided for each plate.

Figures 10, 11:
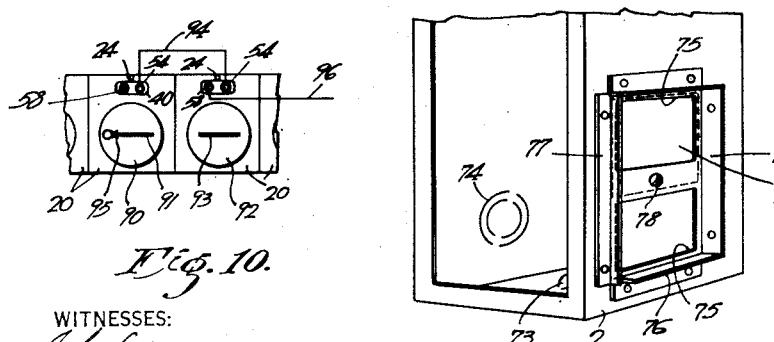
Fig. 10 is a schematic illustration of a method of testing such meters.
Fig. 11 is a partial view, in perspective, of a structural detail of the assembly shown in Fig. 1.

Similarly, in order to simplify the construction, the end box 2 may be made reversible; that is, it may be reversed end-to-end to permit the channels 10 to extend to the left thereof. Referring to Fig. 11, knock-outs 73 are provided in the top and bottom of the box so that either may be used to receive the conduit enclosing the incoming services wires, depending upon which is at the top of the box when installed, and knock-outs 74 are symmetrically disposed with respect to the transverse centerline of the box to receive the incoming conduit if desired.

The wall of the box opposite the knock-outs 74 is provided with pairs of openings 75 corresponding to the number of channels to be used. Each pair is partially surrounded by a flange 76 to which the end of the channel may be suitably secured, and a narrower flange 77 extending between the ends of flange 76 to project between the edge of a plate 20 and the base of the bridge 30 of such plate. When the box 2 is in the position shown in Figs. 1 and 11, the service conductors extend from the interior of the box through the lower of the two openings 75 into the lower half of the channel. The upper opening 75 may be closed by a plate 79 within the box 2 secured in position, as by a screw threaded into a hole 78 in the partition between the openings 75, or otherwise. When the box 2 is reversed to accommodate channels extending to the left, the lower opening 75 of Fig. 11 will communicate with the upper half of the channel, but it is merely necessary to reverse the position of plate 79 to afford access to the opening 75 communicating with the lower half of the channel, and close the upper opening 75.

It is to be understood that Fig. 11 shows only the lower third of the end box 2 shown in Fig. 1, but the box is substantially symmetrical in construction on both sides of its lateral centerline.

Referring to Fig. 9, each meter includes a current winding 80 and a potential winding 81. The current winding is connected between the meter contact blades 16 and 17. The potential winding is connected between the contact blades 17 and 18 and may be grounded, as at 82 to the meter casing. Blades 18 and 19 are electrically connected by jumper 47 within the meter casing, as previously described.

The contact jaws are shown to the right of their respective meter contact blades. Jaw 36 is connected to one of the phase conductors, such as 5, through the conducting strip and terminal post 42. Jaw 44 is connected through conducting strip 43 to terminate post 46, for receiving the neutral conductor 8, and to the load terminal 45.

The circuit for the current coil 80 extends from jaw 36 through blade 17, the current coil, blade 16 and jaw 34, the strap 38, terminals 58 and 54 to the live load conductor 55. The other side of the load circuit, conductor 83, is extended with conductor 55 to the consumer's premises. As shown in Fig. 1, the load conductors 55 and 83 may be enclosed in flexible conduit 84, although any suitable covering means may be employed. All of the load wires of a row of meters may extend through the upper part of the channel and leave through knock-out openings in the end plate 66, as in the upper row of Fig. 1, or they may leave the channel through the knock-out openings in the side of the channel 10, as in the lower rows of Fig. 1, and be extended upwardly behind upper rows of meters, as shown, or in any desired direction.

In assembling the structure described, the end box 2 may be laid upon the floor and the channels 10 suitably secured thereto with their free ends properly aligned and secured to the support 13. The assembly may then be mounted upon a wall. The three phase conductors and the neutral conductor are then brought into the chamber 2 and the neutral conductor secured to the neutral bus 9. A neutral wire is then extended through each channel, from the bus 9, and one of the phase conductors is extended through each channel from the respective fuses 4. The neutral conductor need not be insulated, but if it is covered, spaced points on it as well as on the insulated phase conductor are skinned-off at points corresponding to the positions of the terminal posts 42 and 46 when the sub-base plates 20 are in position. The terminal posts 42 and 46 readily permit the insertion of these conductors without breaking them, and the present invention contemplates that, if desired, all of the conductors may be uninsulated bus bars because the neutral conductor is at ground potential and the phase conductor is sufficiently spaced from the channel member and conducting parts of the sub-base, and supported at sufficiently closely spaced points, to avoid the necessity of insulation.

The sub-bases 20 are then placed in position and the phase and neutral conductors are secured to the appropriate terminals 42 and 46. A load conductor 55 is then connected to the terminal 54 of each plate 20, and load conductors 83 connected to the load terminals 45. The load conductors may then be either extended longitudinally of the channel, as indicated in the upper channel of Fig. 1, or may be extended through knock-outs in the sides of the channel through flexible conduit, or otherwise, as described above, to the consumer's premises.

The meters as shown in Fig. 4 are then mounted on the sub-bases by a thrust movement, and are sealed thereto by rings 26.

It should be apparent that in accordance with the present invention, an efficient mounting for meters has been obtained. It has been found that an over-all saving of as much as thirty percent. of the cost of installing conventional meters is obtained. The over-all space requirements for a given number of meters is reduced substantially but in spite of this there is more space around each meter than is usually found in a group mounting of conventional meters, thereby facilitating testing and adjustment of the individual meters.

In addition, an installation in accordance with the present invention has many advantages in preventing or discouraging the unauthorized theft of energy—or the diversion of energy around the meter. By reason of the partition 64 (Fig. 2) butting against the meter base, a jumper connecting the terminal jaws 34 and 36 in an attempt to shunt the current coil of the meter would result in a short circuit between jaw 36 and ground, if a bare conductor is used, or will prevent proper seating of the meter on the collar 22 if an insulated jumper is used. In the latter event, the sealing ring could not be applied, and the theft may be readily detected.

Also, the partitions 64 and the bridge structures 30 of adjacent plates constitute a substantially unbroken partition throughout the length of the channel to effectively isolate the service and load conductors and render difficult any bridging of such conductors below the upper edge of the partitions.

Further, the neutral potential connection to the potential winding 81 may be grounded to and within the meter casing as at 82 (Fig. 9), and the grounded neutral conductor 8 is connected directly to the meter mounting at terminal post 46.

This eliminates the possibility of opening the potential coil connections external to the meter to stop its registration and also prevents a reversal of service wires for the purpose of diversion.

The connection block 40 has only a metered circuit (conductor 55) connected to it. There is no service terminal accessible from this point, as is common in conventional meter practice, and the possibility of diversion in this manner is eliminated.

Further, the plates 20 are secured to the channel by three screws, 24 at the top and bottom of the plate and 39 in the base of the channel. All of these screws are under seal. Screw 39 and the lower screw 24 are covered by the meter mounting, and upper screw 24 is covered by the hinged and sealed cover 61. The cover 61 may be padlocked, if desired, after disconnecting a load circuit by backing-off the nut 59, but under normal conditions it need not be sealed or locked because the only terminals exposed are in the load circuit, and the plate cannot be removed by unscrewing the upper screw 24 unless the lower screw 24 and screw 39 are also removed.

It should also be apparent that the testing of the meters when installed as described is rendered simple with the possibility of phase-to-phase short circuits eliminated by reason of the segregation of the phase conductors in separate channels. Each of the terminals 54 and 58 being provided with head portions for accommodating standard test-clips, the meters may readily be tested without removing them from the channels, if desired.

The method of testing the meters when installed in accordance with the invention is shown diagrammatically in Fig. 10, wherein is indicated two adjacent meters 90 and 92 having disc armatures 91 and 93, respectively, and terminals 54 and 58 as previously described.

Assuming that meter 92 is to be tested, a jumper 94 is clipped across the terminals 54 of meters 90 and 92 so that the load circuit of meter 92 will be supplied through meter 90. If desired a clip 95 may be applied to the disc 91 of meter 90 to prevent rotation thereof and consequent registration of the meter. The jumper 94 may be extended from terminal 54 of meter 90 to the respective terminals 54 of the other meters in the row as they are tested. The terminal 54 of meter 90 thereby becomes an unmetered service point for all of the meters in the row. When all have been tested, the clip 95 may be applied to the disc of a tested meter, such as 92, and the jumper may then be used to supply the load connected to meter 90.

Referring again to meter 92, the nut on terminal 58 is backed-off to break the connection between 54 and 58, and a conductor 96 is clipped on terminal 58 for applying a standard load to the current coils of meter 90. The potential for the test may be obtained between terminal 58 and the securing screw 24, which is at ground potential. As is usual in such tests, the current coils of meter 92 and the standard meter are connected in series with each other and with the test load, and the potential coils of the meters are connected in parallel between the phase conductor and ground.

Various modifications may be made in the structure described without departing from the spirit of the present invention, and it is desired that no limitations be placed thereon except as imposed by the prior art and set forth in the appended claims.

I claim as my invention:

1. A metering system for a plurality of single phase load circuits fed from a polyphase supply circuit, including a plurality of conduit channels each containing conductors for only one phase of said supply circuit, means for closing said channels comprising a plurality of plates secured to the channels each having an aperture for receiving the base of a meter, contacts within the channel exposed through such apertures and connected to said phase conductors, a pair of load circuit conductors for each plate within said channel and contact means connected thereto exposed through said apertures, a second aperture in each of said plates and means exposed therethrough for controlling the connection of at least one of each pair of load circuit conductors to its associated contact means.

2. A metering system for a plurality of single phase load circuits fed from a polyphase supply circuit including a plurality of conductor channels each containing conductors for only one phase of said supply circuit, means for closing said channels comprising a plurality of plates secured to the channels each having an aperture proportioned to be closed by the base of a meter, contacts within the channel exposed through such apertures and connected to said phase conductors, a pair of load circuit conductors for each plate within said channel and contact means connected thereto exposed through said apertures, a second aperture in each of said plates and means exposed therethrough for controlling the connection of at least one of said load circuit conductors to its associated contact means, means for covering said second apertures to enclose said controlling means, and means for securing said meters to their respective plates.

3. In combination with an electrical instrument having electrical contacts projecting from the base thereof, means for mounting said instrument including a plate having an aperture therein proportioned to be closed by said base, contacts carried by said plate in a position to engage said base contacts when the instrument is in operative position, means for securing and sealing said instrument in operative position, a second aperture in said plate, a circuit controlling device in circuit with one of said plate contacts and secured to the plate for access through said second aperture, and means for closing and sealing said second aperture.

4. In combination with a receptacle having electrical conductors therein, and an electric meter having contacts projecting from the base thereof, of means for mounting said meter on the receptacle comprising a closure for the receptacle having an opening therein proportioned to be closed by said meter base, a plurality of contact means in said receptacle registering with said opening in a position to be engaged by said meter contacts, a partition carried by said closure for separating certain of said contact means and having an edge thereof substantially flush with the plane of said opening, and means for securing the meter to said closure in operative position.

5. A mounting for a plurality of meters comprising a conduit channel containing electrical conductors, a plurality of plates disposed in edge-to-edge relation substantially closing the open face of said channel each having an aperture proportioned to be closed by a meter casing, electrical contact supporting means carried by said plates within said channel, and means engaging the contact supporting means and edges of adjacent plates for interlocking them against relative movement in a direction perpendicular to the plane of the plates.

6. A mounting for a plurality of meters comprising a conduit channel containing electrical conductors, a plurality of plates disposed in edge-to-edge relation substantially closing the open face of said channel each having an aperture proportioned to be closed by a meter casing, means for securing said plates to said channels, and means disposed behind the edges of adjacent plates for interlocking the plates against relative movement in a direction perpendicular to the plane of the plates.

7. A mounting for a plurality of meters comprising a conduit channel containing electrical conductors, a plurality of plates disposed in edge-to-edge relation substantially closing the open face of said channel each having an aperture proportioned to be closed by a meter casing, means for securing said plates to said channel, and means carried by said plates constituting substantially a continuous partition throughout the length of that portion of the channel covered by the plates.

8. A mounting for a plurality of electrical meters comprising a conduit channel containing supply circuit conductors and load circuit conductors, a plurality of mounting plates secured to said channel in edge-to-edge relation and substantially closing the open face thereof, electrical contact devices on each plate within said channel respectively connected to said supply and load conductors, and means carried by said plates for isolating said supply conductors and contact devices from said load conductors and contact devices throughout the length of the channel.

9. A mounting for an electric meter comprising a body having an aperture proportioned to be closed by a meter casing, a supporting structure bridging said aperture and secured to said body on the side thereof opposite to said meter, a plurality of electrical contact means mounted on said supporting structure, and means carried by said structure constituting a partition between certain of said contact means and having one edge extending across said aperture substantially in the plane thereof.

ALBERT J. ALLEN.